(12) United States Patent
Kemmel et al.

(10) Patent No.: US 10,067,932 B2
(45) Date of Patent: Sep. 4, 2018

(54) ISOLATING SEGMENTS OF BIDIRECTIONAL TEXT

(71) Applicant: INTERNATIONAL BUSINESS MACHINES CORPORATION, Armonk, NY (US)

(72) Inventors: Lina Kemmel, Maale Adumim (IL); Tomer Mahlin, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/075,281

(22) Filed: Mar. 21, 2016

(65) Prior Publication Data
US 2017/0270090 A1 Sep. 21, 2017

(51) Int. Cl.
G06F 17/27 (2006.01)
G06F 17/22 (2006.01)
G06F 17/24 (2006.01)

(52) U.S. Cl.
CPC ........ *G06F 17/272* (2013.01); *G06F 17/2223* (2013.01); *G06F 17/24* (2013.01); *G06F 17/274* (2013.01)

(58) Field of Classification Search
CPC .................................................. G06F 17/2223
See application file for complete search history.

(56) References Cited

U.S. PATENT DOCUMENTS

2003/0023590 A1* 1/2003 Atkin ............... G06F 17/30896
2004/0177322 A1* 9/2004 Atkin .................. G06F 17/2247
715/234
2006/0265649 A1* 11/2006 Danilo ............... G06F 17/2217
715/256
2012/0109634 A1 5/2012 Lanin et al.
2014/0157441 A1* 6/2014 Georgiev ............... G06F 21/10
726/32

OTHER PUBLICATIONS

Unicode, Org., "Unicode Bidirectional Algorithm," Unicode® Standard Annex #9, Technical Reports, May 29, 2015, Version: Unicode 8.0.0, http://unicode.org/reports/tr9/, Copyright 2000-2015 Unicode, Inc., Printed on Feb. 29, 2016, pp. 1-52.
Lanin et al., "A Proposal for Bidi Isolates in Unicode," Oct. 9, 2012, Live document: http://goo.gl/K6qtV, pp. 1-26.
Hossari et al., "Pattern-based Enhancements to Unicode Bidirectional Algorithm," The International Journal of Localisation, vol. 11, Issue 1, Copyright 2012, Localisation Research Centre, pp. 4-13.

\* cited by examiner

*Primary Examiner* — Qian Yang
(74) *Attorney, Agent, or Firm* — Erick K. Johnson (57) ABSTRACT

Embodiments of the present invention include a method, system, and computer program product for isolating a segment of bidirectional text. A segment of bidirectional text may be identified. A Unicode left-to-right character (LRM) may be inserted on at least a first side of the segment of bidirectional text. A Unicode right-to-left character (RLM) may be inserted on at least a second side of the segment of bidirectional text. The segment of bidirectional text may be processed through a Unicode Bidirectional Algorithm (UBA) implementation. A directionality mismatch between the LRM and the RLM may cause a conflict. In response to the conflict, the Unicode Bidirectional Algorithm may select a base text direction for the segment of bidirectional text.

14 Claims, 5 Drawing Sheets

FIG. 1

| | Left-To-Right (LTR) Text | |
|---|---|---|
| | TEXT 1 (English) | TEXT 2 (Hebrew) |
| Original Text Buffer | User Name – 01/02/2016 – 10 | שם משתמש – 01/02/2016 – 10 |
| No Preprocessing | User Name – 01/02/2016 – 10 | 01/02/2016 – שם משתמש – 10 |
| Preprocessing with LRM only | User Name – 01/02/2016 – 10 | שם משתמש – 01/02/2016 – 10 |
| Preprocessing with RLM only | User Name – 01/02/2016 – 10 | 01/02/2016 – שם משתמש – 10 |
| Preprocessing with LRM and RLM | User Name – 01/02/2016 – 10 | שם משתמש – 01/02/2016 – 10 |

FIG. 2A

250 — Right-To-Left (RTL) Text

| | TEXT 1 (English) | TEXT 2 (Hebrew) |
|---|---|---|
| Original Text Buffer | User Name – 01/02/2016 – 10 | שם משתמש – 01/02/2016 – 10 |
| No Preprocessing | User Name – 01/02/2016 – 10 | 10 – 01/02/2016 – שם משתמש |
| Preprocessing with LRM only | User Name – 01/02/2016 – 10 | 10 – 01/02/2016 – שם משתמש |
| Preprocessing with RTM only | 01/02/2016 – User Name 10 – | 10 – 01/02/2016 – שם משתמש |
| Preprocessing with LRM and RLM | 01/02/2016 – User Name 10 – | 10 – 01/02/2016 – שם משתמש |

```
┌─────────────────────────────────────────────────┐
│   Receiving the segment of bidirectional text.  │
│                      204                        │
└─────────────────────────────────────────────────┘
                        │
                        ▼
┌─────────────────────────────────────────────────┐
│ Inserting a Unicode left-to-right character (LRM) on a first side │
│         of the segment of bidirectional text.    │
│                      208                        │
└─────────────────────────────────────────────────┘
                        │
                        ▼
┌─────────────────────────────────────────────────┐
│ Inserting a Unicode right-to-left character (RLM) on a second │
│         side of the segment of bidirectional text.│
│                      212                        │
└─────────────────────────────────────────────────┘
                        │
                        ▼
┌─────────────────────────────────────────────────┐
│ Processing the segment of bidirectional text through a │
│   Unicode Bidirectional Algorithm (UBA) implementation. │
│                      216                        │
└─────────────────────────────────────────────────┘
```

ISOLATING SEGMENTS OF BIDIRECTIONAL TEXT

BACKGROUND

The present invention relates generally to the field of computing, and more particularly to isolating segments of bidirectional text if an embedded direction is unknown.

The appearance of bidirectional text may be regulated by the Unicode Bidirectional Algorithm (UBA). The UBA and UBA implementations may treat text as plain (free-form) text. However, not all text is plain text. Some text may include a defined structure, such as, for example, structured text (STT). Examples of STT include Uniform Resource Identifier (URI), email address, formula, and a graphical control element (e.g., breadcrumbs). For proper display and functioning, text structure may need to be maintained for STT.

SUMMARY

Embodiments of the present invention disclose a method for isolating a segment of bidirectional text. The method may include identifying a delimited segment of bidirectional text. The method may include inserting a Unicode left-to-right character (LRM) on a first side of the delimited segment of bidirectional text. The method may include inserting a Unicode right-to-left character (RLM) on a second side of the delimited segment of bidirectional text. The method may further include inserting the LRM on the second side of the delimited segment of bidirectional text and inserting the RLM on the first side of the delimited segment of bidirectional text. The delimited segment of bidirectional text may be structured text. The method may include receiving the bidirectional text comprising the delimited segment of bidirectional text. The method may include processing the delimited segment of bidirectional text through a Unicode Bidirectional Algorithm (UBA) implementation. The delimited segment of bidirectional text may have a base text direction of at least one of left-to-right or right-to-left. The base text direction of the delimited segment of bidirectional text may be unknown to a user. The method may include causing a conflict based on a directionality mismatch between the inserted LRM and the inserted RLM and, in response to the conflict, the method may include selecting a base text direction for the segment of bidirectional text.

Embodiments of the present invention disclose a computer program product for isolating a segment of bidirectional text. The computer program product may include a computer readable storage medium having program instructions embodied therewith. The computer readable storage medium is not a transitory signal per se. The program instructions may be executable by a computer to cause the computer to perform a method. The method may include identifying a delimited segment of bidirectional text. The method may include inserting a Unicode left-to-right character (LRM) on a first side of the delimited segment of bidirectional text. The method may include inserting a Unicode right-to-left character (RLM) on a second side of the delimited segment of bidirectional text. The method may further include inserting the LRM on the second side of the delimited segment of bidirectional text and inserting the RLM on the first side of the delimited segment of bidirectional text. The delimited segment of bidirectional text may be structured text. The method may include receiving the bidirectional text comprising the delimited segment of bidirectional text. The method may include processing the delimited segment of bidirectional text through a Unicode Bidirectional Algorithm (UBA) implementation. The delimited segment of bidirectional text may have a base text direction of at least one of left-to-right or right-to-left. The base text direction of the delimited segment of bidirectional text may be unknown to a user. The method may include causing a conflict based on a directionality mismatch between the inserted LRM and the inserted RLM and, in response to the conflict, the method may include selecting a base text direction for the segment of bidirectional text.

Embodiments of the present invention disclose a system for isolating a segment of bidirectional text. The system may include one or more computer processors. The system may include one or more computer-readable storage media. The system may include program instructions stored on the computer-readable storage media for execution by at least one of the one or more processors. The program instructions may include instructions to identify a delimited segment of bidirectional text. The program instructions may include instructions to insert a Unicode left-to-right character (LRM) on a first side of the delimited segment of bidirectional text. The program instructions may include instructions to insert a Unicode right-to-left character (RLM) on a second side of the delimited segment of bidirectional text. The program instructions may further include instructions to insert the LRM on the second side of the delimited segment of bidirectional text and instructions to insert the RLM on the first side of the delimited segment of bidirectional text. The delimited segment of bidirectional text may be structured text. The program instructions may further include instructions to receive the bidirectional text comprising the delimited segment of bidirectional text. The program instructions may further include instructions to process the delimited segment of bidirectional text through a Unicode Bidirectional Algorithm (UBA) implementation. The delimited segment of bidirectional text may have a base text direction of at least one of left-to-right or right-to-left. The base text direction of the delimited segment of bidirectional text may be unknown to a user.

BRIEF DESCRIPTION OF THE SEVERAL VIEWS OF THE DRAWINGS

The following detailed description, given by way of example and not intended to limit the invention solely thereto, will best be appreciated in conjunction with the accompanying drawings.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Embodiments of the present invention may isolate segments of bidirectional text if a paragraph direction is unknown at design time or is known at design time, but can be overridden at run time. Appearance of bidirectional text may be regulated by the Unicode Bidirectional Algorithm (UBA). The UBA and UBA implementations may treat text as plain (free-form) text. However, not all text is plain text. Some text may include a defined structure, such as, for example, structured text (STT). Examples of STT include Uniform Resource Identifier (URI), email address, formula, and a graphical control element (e.g., breadcrumbs). For proper display and functioning, text structure for STT may need to be maintained visually and logically. UBA implementations may not account for internal structure, and thus may not be able to maintain text structure. Preprocessing may be necessary before passing structured bidirectional text through a UBA implementation. To customize text appearance, the Unicode Standard provides control characters and marks, but current BiDi implementations may be ineffective if a base (paragraph) direction of a text is unknown. If a bidirectional text is known to be left-to-right (LTR), an LRM character may be inserted adjacent to each delimiter to force a presentation system to treat the delimiter as a strong LTR character, as shown below:

TOKEN_A<LRM>-TOKEM_B-<LRM>TOKEN_C

If a bidirectional text is known to be right-to-left, an RLM character may be inserted next to each delimiter to force a presentation system to treat the delimiter as a strong RTL character, as shown below:

TOKEN_A<RLM>-TOKEM_B-<RLM>TOKEN_C

However, the Unicode Standard does not provide a character for bidirectional text with an unknown base direction. Thus, a method and system is needed for maintaining a text structure for structured bidirectional text with an unknown base direction.

Embodiments of the present invention may provide a method and system for maintaining a text structure for structured bidirectional text with an unknown base direction. Embodiments of the present invention may include surrounding a sequence of neutral characters (e.g., with unknown or modifiable paragraph direction) delimiting text tokens with two bidi characters of mismatching directionality. Embodiments of the present invention will now be described in detail with reference to FIGS. 1-4.

Figure 1:
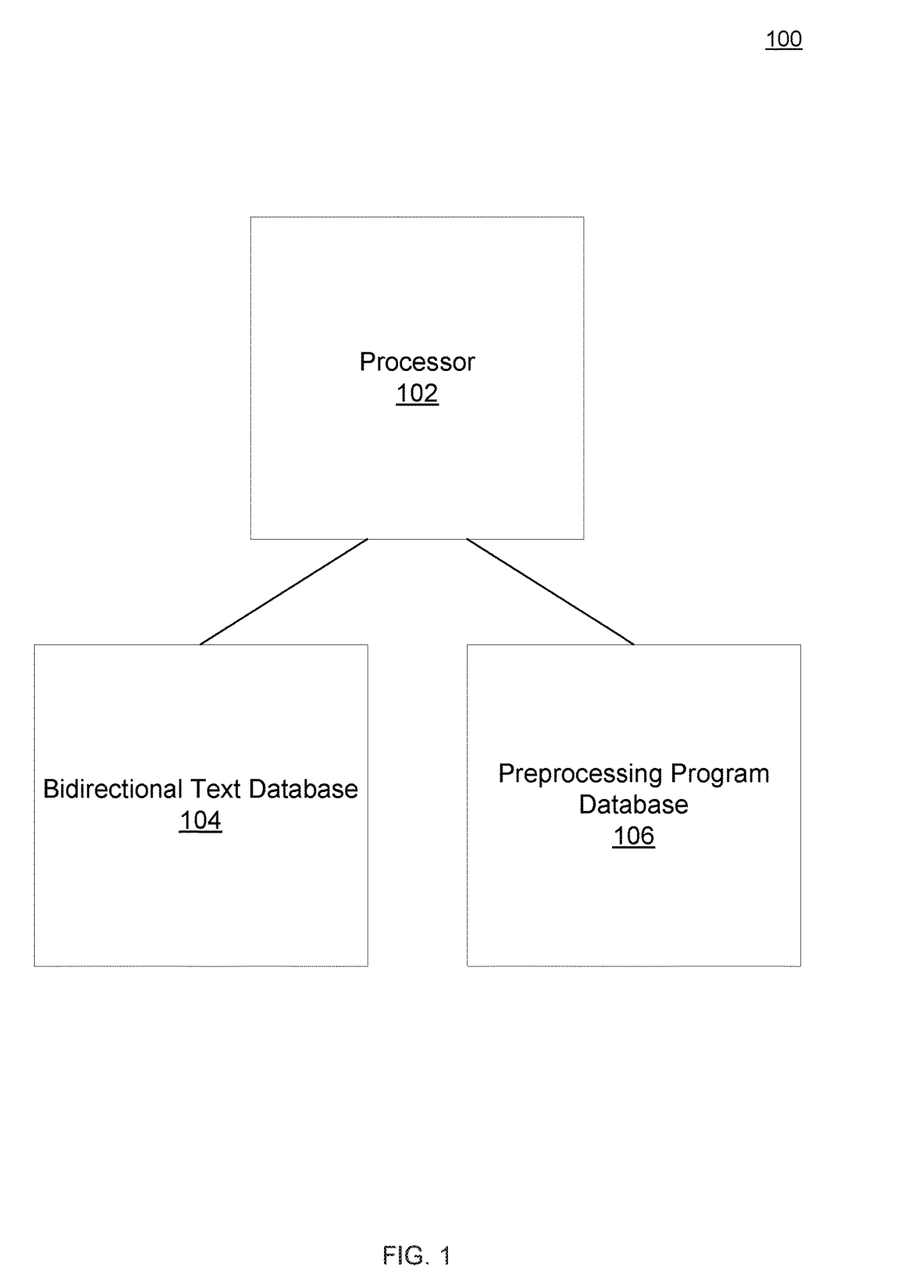
FIG. 1 is a diagram illustrating a preprocessing system, in accordance with an embodiment of the present invention.

FIG. 1 is a diagram illustrating a preprocessing system 100, in accordance with an embodiment of the present invention. In an embodiment, the preprocessing system 100 may include a processor 102, a bidirectional text database 104, and a preprocessing program database 106. The bidirectional text database 104 may include text in one or more languages, such as, for example, Hebrew, Yiddish, Arabic, Farsi, Urdu, or any combination thereof. In an embodiment, a direction of the text in the text database may be unknown. The preprocessing program database 106 may include a preprocessing program. The preprocessing program may be an application, function, or module of a computer program (not shown) executable by the processor 102 of the preprocessing system 100. The processor 102 may execute one or more instructions of the preprocessing program contained in the preprocessing program database 106 to preprocess text of the bidirectional text database. For example, the processor 102 may process bidirectional text of the bidirectional text database with an unknown direction prior to passing the bidirectional text through a UBA implementation. The preprocessing system 100 may be implemented using a computing node such as the computing node of FIG. 4.

Figure 2A:
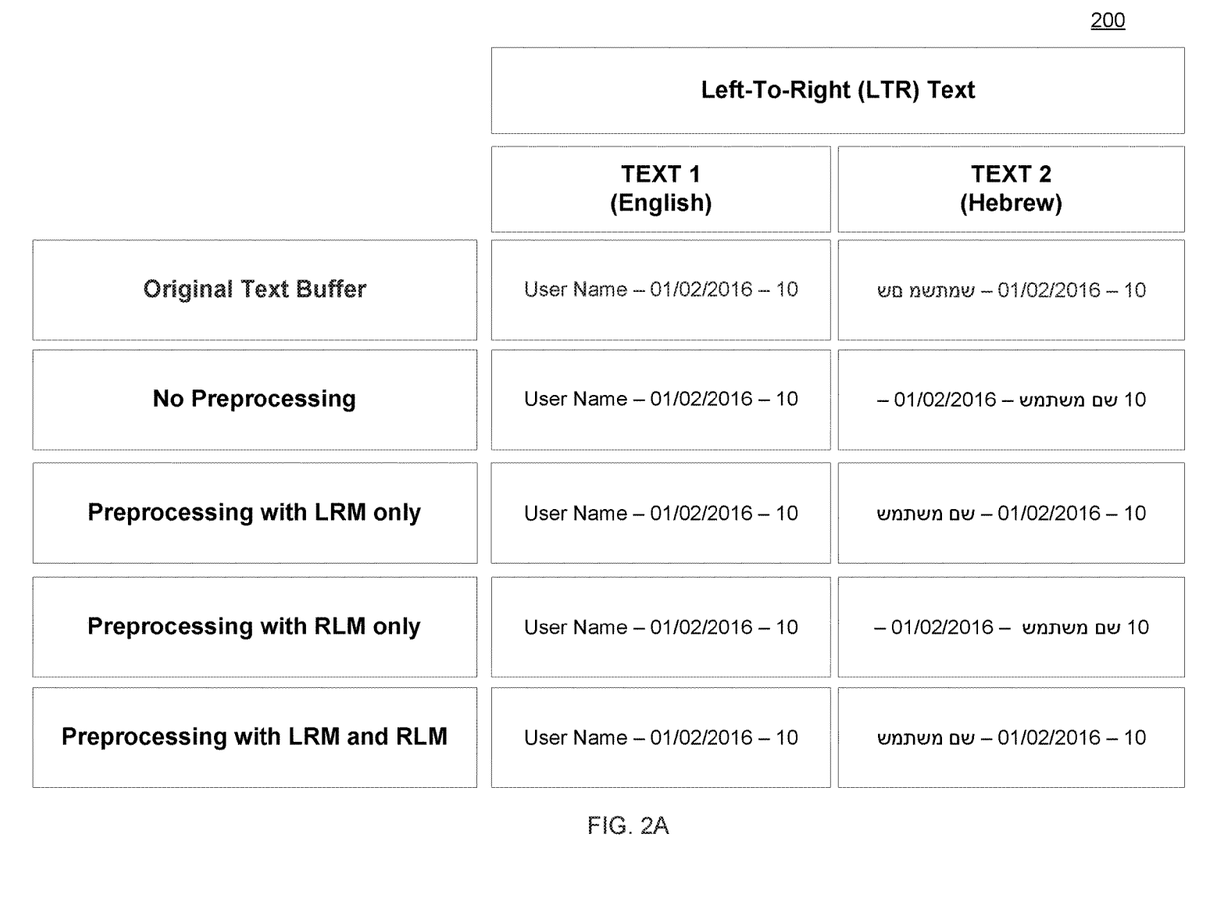
FIGS. 2A-2B are diagrams illustrating a preprocessing bidirectional text, in accordance with an embodiment of the present invention.
Figure 2B:
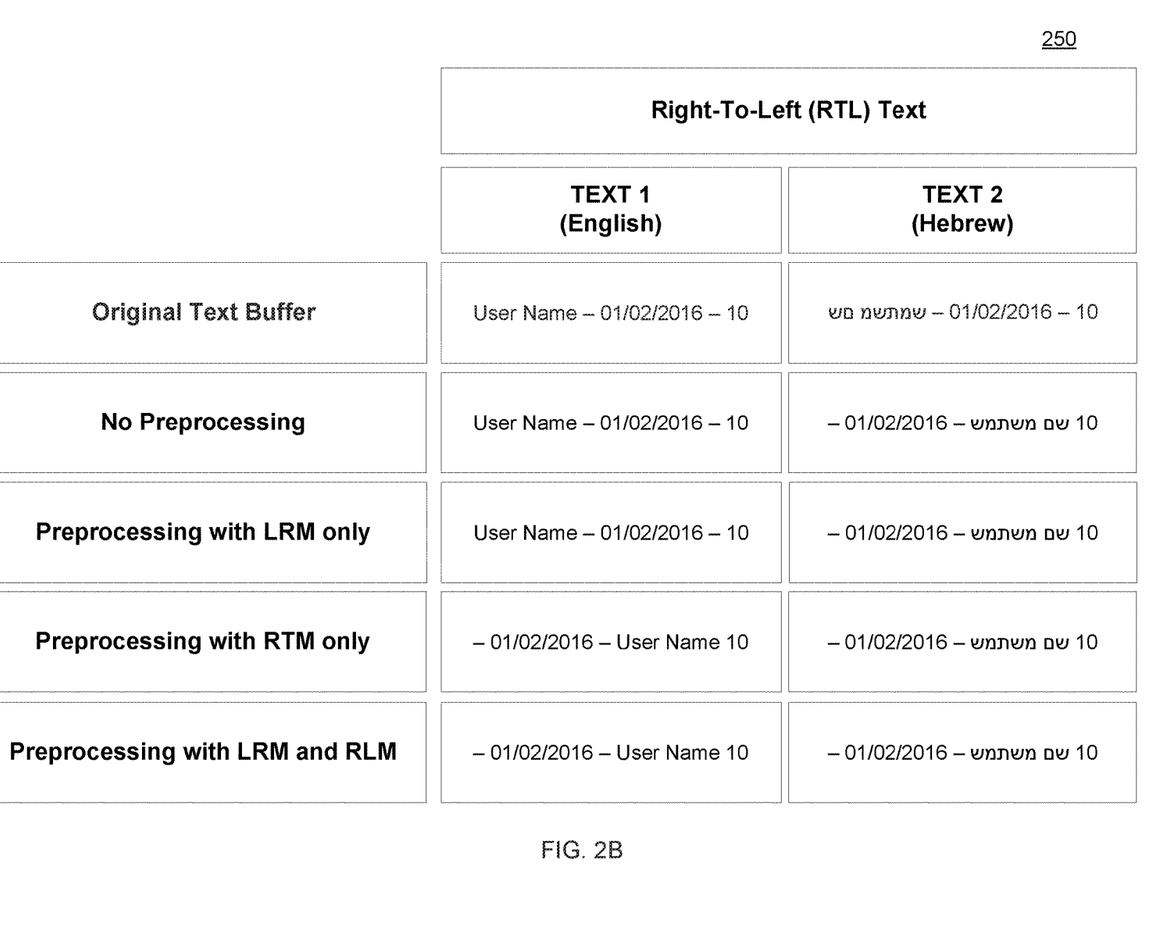

FIGS. 2A-2B are diagrams illustrating a preprocessing bidirectional text, in accordance with an embodiment of the present invention. FIG. 2A includes a left-to-right (LTR) text diagram 200. FIG. 2B includes a right-to-left (RTL) text diagram 250. The LTR text diagram 200 and the RTL text diagram 250 may include preprocessed text in English and Hebrew. Preprocessing of text in various other languages is contemplated, such as, for example, Arabic, Farsi, Urdu, and Yiddish. The text may be preprocessed by the preprocessing application.

In FIG. 2A, the LTR text diagram 200 may include text written from left to right preprocessed using various methods. The text may be passed through a UBA implementation and results may be illustrated in the text diagram 200. In an embodiment, Text 1 may include "User Name-01/02/2016-10" and Text 2 may include "ששם משתמ -01/02/2016-10". Upper case letters (USER NAME) may be used to represent the Hebrew letters (שַׁמְתְּשֵׁם שַׁ) depicted in FIG. 2A. Text 1 and Text 2 may include three segments: (1) "User Name" (in English and Hebrew respectively), (2) date stamp ("01/02/2016"), and (3) a number (e.g., representing user logins). The three segments may be delimited by a sequence of BiDi-neutral characters ("-"). In addition, Text 1 and Text 2 may be displayed isolated from the surrounding content as a whole. Text 1 and Text 2 may be passed through a UBA implementation with (1) no preprocessing, (2) preprocessing using LRM next to each delimiter (which are in our example "-" and an imaginary, zero-width, delimiter before and after Text 1 or Text 2) only, (3) preprocessing using RLM next to each delimiter only, and (4) preprocessing surrounding each delimiter by LRM on a side and RLM on another side.

Text 1 and Text 2 may be passed through a UBA implementation without preprocessing. Passing bidirectional text through a UBA implementation without preprocessing may generate an incorrect result. For example, Text 1 including "User Name-01/02/2016-10" may be passed through a UBA implementation without preprocessing and result in "User Name-01/02/2016-10". In another example, Text 2 including "USER NAME-01/02/2016-10" may be passed through a UBA implementation without preprocessing and result in "-01/02/2016-EMAN RESU 10". By passing Text 2 through a UBA implementation without preprocessing, an incorrect result may be generated.

Text 1 and Text 2 may be passed through a UBA implementation with preprocessing using LRM only. The Unicode Standard includes control characters and marks, but current BiDi implementations may be ineffective if a direction of a text is not known. An LRM character may be inserted adjacent to each delimiter in Text 1 and Text 2 as shown below:

TOKEN_A<LRM>"User Name <LRM>- 01/02/2016 <LRM>-10"<LRM>TOKEN_C
TOKEN_A<LRM>"USER NAME<LRM> - 01/02/2016<LRM> - 10"<LRM>TOKEN_C Passing Text 1 and Text 2 through a UBA implementation may result in "User Name-01/02/2016-10" and "EMAN RESU-01/02/2016-10", respectively. Since Text 1 and Text 2 are LTR, using LRM character(s) may result in a correct text appearance when passed through a UBA implementation.

Text 1 and Text 2 may be passed through a UBA implementation with preprocessing using RLM only. An RLM character may be inserted adjacent to each delimiter in Text 1 and Text 2 as shown below:

```
TOKEN_A<RLM>"User Name<RLM> - 01/02/2016 <RLM>-
   10"<RLM>TOKEN_C
TOKEN_A<RLM>"USER NAME<RLM> -
   01/02/2016<RLM> - 10"<RLM>TOKEN_C
```

Passing Text 1 and Text 2 through a UBA implementation with RLM characters may result in "User Name-01/02/2016-10" and "-01/02/2016-EMAN RESU 10", respectively. Since Text 1 and Text 2 are LTR, the expected progression of the segments is LTR too, so using RLM character(s) may result in incorrectly ordered text when passed through a UBA implementation.

If a base direction of bidirectional text is unknown, conventional use of LRM and RLM characters may not always result in correctly ordered text. However, including LRM on a side and RLM on another side of a segment delimiter may consistently provide correctly ordered text. In an embodiment, Text 1 and Text 2 may be passed through a UBA implementation with preprocessing using LRM on a side and RLM on another side of each delimiter. LRM and RLM characters may be inserted adjacent to Text 1 and Text 2 and adjacent to each segment separator inside Text 1 and Text 2 as shown below:

```
TOKEN_A<RLM><LRM>"User Name<RLM> -
      <LRM>01/02/2016<RLM> - <LRM>10"<LRM>
      <RLM>TOKEN_C
TOKEN_A<RLM><LRM>"USER NAME<RLM> -
      <LRM>01/02/2016<RLM> - <LRM>10"<LRM>
      <RLM>TOKEN_C
```

Passing Text 1 and Text 2 through a UBA implementation with RLM and LRM characters adjacent to each segment separator may correctly result in "User Name-01/02/2016-10" and "EMAN RESU-01/02/2016-10", respectively. Regardless of an embedded direction of Text 1 and Text 2, using RLM and LRM characters in combination may result in correctly ordered text when passed through a UBA implementation.

In FIG. 2B, the RTL text diagram 250 may include text written from right to left preprocessed using various methods. The text may be passed through a UBA implementation and results may be illustrated in the text diagram 250. In an embodiment, Text 1 may include in buffer "User Name-01/02/2016-10" and Text 2 may include "USER NAME-01/02/2016-10". Upper case English letters (USER NAME) may represent the Hebrew letters ( שמשמם ) depicted in FIG. 2B. Text 1 and Text 2 may include three segments: (1) "User Name" (in English and Hebrew respectively), (2) date stamp ("01/02/2016"), and (3) a number (e.g., representing user logins). The three segments may be delimited by a sequence of BiDi-neutral characters ("-"). In addition, Text 1 and Text 2 may be displayed isolated from the surrounding content as a whole. Text 1 and Text 2 may be passed through a UBA implementation with (1) no preprocessing, (2) preprocessing using LRM next to each delimiter (which are in our example "-" and an imaginary, zero-width, delimiter before and after Text 1 or Text 2) only, (3) preprocessing using RLM next to each delimiter only, and (4) preprocessing surrounding each delimiter by LRM on a side and RLM on another side.

Text 1 and Text 2 may be passed through a UBA implementation without preprocessing. Passing bidirectional text through a UBA implementation without preprocessing may generate an incorrect result. For example, Text 1 including "User Name-01/02/2016-10" in buffer may be passed through a UBA implementation without preprocessing and result in "User Name-01/02/2016-10" in display. In another example, Text 2 including "USER NAME-01/02/2016-10" may be passed through a UBA implementation without preprocessing and correctly result in "-01/02/2016-EMAN RESU 10" in display. In an embodiment, passing text through a UBA implementation without preprocessing may or may not result in text being displayed in a correct direction.

Text 1 and Text 2 may be passed through a UBA implementation with preprocessing using LRM only. The Unicode Standard includes control characters and marks, but current BiDi implementations may be ineffective if a direction of a text is not known. An LRM character may be inserted adjacent to Text 1 and Text 2 and next to each delimiter, as shown below:

```
TOKEN_A<LRM>"User Name <LRM>- 01/02/2016<LRM> -
   10"<LRM>TOKEN_C
TOKEN_A<LRM>"USER NAME <LRM> -
   01/02/2016<LRM> - 10"<LRM>TOKEN_C
```

Passing Text 1 and Text 2 through a UBA implementation with LRM characters may result in "User Name-01/02/2016-10" and "-01/02/2016-EMAN RESU 10", respectively. Since Text 1 and Text 2 are RTL, LRM character(s) may result in incorrectly ordered text when passed through a UBA implementation.

Text 1 and Text 2 may be passed through a UBA implementation with preprocessing using RLM only. An RLM character may be inserted adjacent to Text 1 and Text 2 and next to each delimiter, as shown below:

```
TOKEN_A<RLM>"User Name <RLM> - 01/02/2016<RLM> -
   10"<RLM>TOKEN_C
TOKEN_A<RLM>"USER NAME<RLM> -
   01/02/2016<RLM> - 10"<RLM>TOKEN_C
```

Passing Text 1 and Text 2 through a UBA implementation with RLM characters may result in "-01/02/2016-User Name 10" and "-01/02/2016-EMAN RESU 10" display, respectively. Since Text 1 and Text 2 are RTL, the expected progression of the segments is RTL too, so RLM character(s) may result in correctly ordered text when passed through a UBA implementation.

If a base direction of bidirectional text is unknown, conventional use of LRM and RLM characters may not always result in correctly ordered text. However, including LRM on a side and RLM on another side may consistently provide correctly ordered text. In an embodiment, Text 1 and Text 2 may be passed through a UBA implementation with LRM on a side and RLM on another side. LRM and RLM characters may be inserted adjacent to Text 1 and Text 2 and surround each delimiter, as shown below:

```
TOKEN_A<RLM><LRM>"User Name<RLM> -
      <LRM>01/02/2016<RLM> - <LRM>10"<LRM>
      <RLM>TOKEN_C
   TOKEN_A<RLM><LRM>"USER NAME <RLM> -
      <LRM>01/02/2016<RLM> - LRM>10"<LRM>
      <RLM>TOKEN_C
```

Passing Text 1 and Text 2 through a UBA implementation with adjacent RLM and LRM characters may result in "-01/02/2016-User Name 10" and "-01/02/2016-EMAN RESU 10", respectively. Regardless of a direction of Text 1 and Text 2, using RLM and LRM characters in combination may result in correctly ordered text when passed through a UBA implementation.

Figure 3:
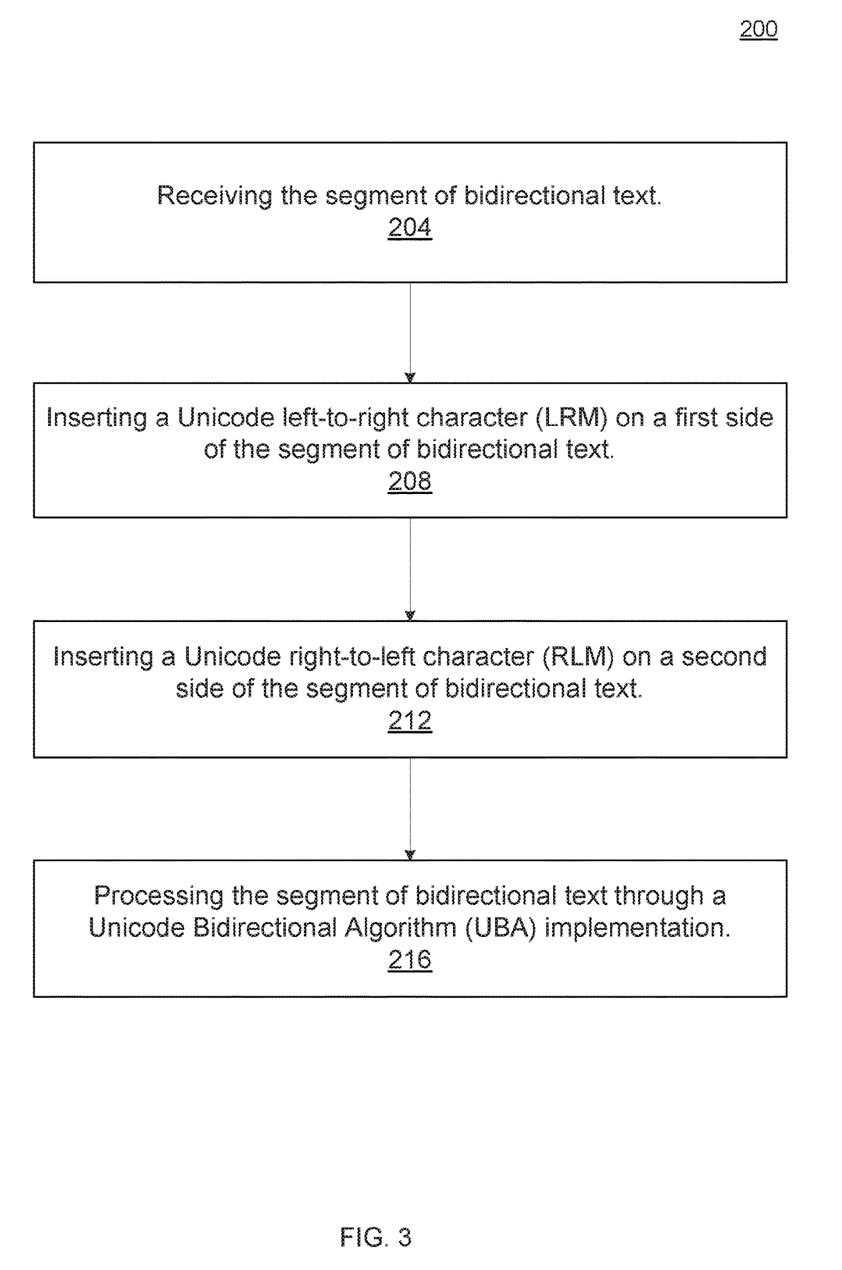
FIG. 3 is a flowchart depicting operational steps of a preprocessing program, in accordance with an embodiment of the present invention.

FIG. 3 is a flowchart of a method 300 for isolating segments of bidirectional text, using the preprocessing system 100 of FIG. 1, in accordance with an embodiment of the present invention. Steps of method 300 may be executed using a processor of a computer that encompasses, or is part of, preprocessing system 100, or another system. In an embodiment, a method of isolating segments of bidirectional text may involve receiving the segment of bidirectional text (step 204), inserting a Unicode left-to-right character (LRM) on a first side of the segment of bidirectional text (step 208), inserting a Unicode right-to-left character (RLM) on a second side of the segment of bidirectional text (step 212), and processing the segment of bidirectional text through a Unicode Bidirectional Algorithm (UBA) implementation (step 216).

Step 204 may involve receiving the segment of bidirectional text. The segment of bidirectional text may be a portion of a text file. The received segment of bidirectional text may be stored, for example, in the Bidirectional Text Database 104 (FIG. 1). The segment of bidirectional text may be received by one or more input/output devices, such as, for example, an I/O Interface 22, as described in FIG. 4.

Step 208 may involve inserting a Unicode left-to-right character (LRM) on a first side of the segment of bidirectional text. In an example, a text string may include a segment of bidirectional text (e.g., "TOKEN_B") as follows:
TOKEN_A-TOKEN_B-TOKEN_C
In an example, inserting the LRM character on a first side of the segment of bidirectional text may appear as follows:
TOKEN_A<LRM>-TOKEN_B-TOKEN_C
Embodiments include inserting more than one LRM character on the first side and/or on a second side of the segment of bidirectional text. For example, inserting the LRM on the second side of the segment of bidirectional text may appear as follows:
TOKEN_A<LRM>-TOKEN_B-<LRM>TOKEN_C
Embodiments including inserting one or more LRM characters on either side of the segment of bidirectional text. The examples included above are by way of example and not intended to limit a number or side for inserting the LRM.

Step 212 may involve inserting a Unicode right-to-left character (RLM) on a second side of the segment of bidirectional text. In an example, a text string may include a segment of bidirectional text (e.g., "TOKEN_B") as follows:
TOKEN_A-TOKEN_B-TOKEN_C
In an example, inserting the RLM character on a first side of the segment of bidirectional text may appear as follows:
TOKEN_A<RLM>-TOKEN_B-TOKEN_C
Embodiments include inserting more than one LRM character on the first side and/or on a second side of the segment of bidirectional text. Having an LRM character on a first side and a second side of the segment of bidirectional text may be described as surrounding the segment of bidirectional text with LRM characters. For example, inserting the LRM on the second side of the segment of bidirectional text may appear as follows:
TOKEN_A<RLM>-TOKEN_B-<RLM>TOKEN_C
Embodiments including inserting one or more LRM characters on either side of the segment of bidirectional text. The examples included above are by way of example and not intended to limit a number or side for inserting the LRM.

Referring to steps 208 and 212 above, embodiments contemplate inserting the LRM and RLM in any order and in any combination. In an embodiment, the LRM may be inserted on a first side and the RLM may be inserted on a second side. For example, the segment of bidirectional text with inserted LRM and RLM may appear as follows:
TOKEN_A<LRM>-TOKEN_B-<RLM>TOKEN_C
In an embodiment, the LRM and the RLM may be inserted on a first side and the LRM and the RLM may be inserted on the second side. For example, the segment of bidirectional text with LRM and RLM inserted on the first and second sides may appear as follows:
TOKEN_A<RLM><LRM>-TOKEN_B-<LRM><RLM>TOKEN_C In another example, the segment of bidirectional text with LRM and RLM inserted on the first and second sides may appear as follows:
TOKEN_A<LRM><RLM>-TOKEN_B-<LRM><RLM>TOKEN_C
Embodiments including LRM and RLM inserted in any order are contemplated. Embodiments include inserting the LRM and the RLM in any combination on any side of the segment of bidirectional text.

Step 216 may involve processing the segment of bidirectional text through a Unicode Bidirectional Algorithm (UBA) implementation. Processing the segment of bidirectional text may include, for example, executing instructions of the UBA on the segment of bidirectional text and receiving an output from the UBA containing a processed segment of bidirectional text. In an embodiment, the segment of bidirectional text including the inserted LRM and the inserted RLM on either side may be passed through a UBA implementation. Inserting the LRM and the RLM may cause a directionality mismatch and, according to the UBA, at least one of them (LRM in LTR paragraph or RLM in RTL paragraph) may match the paragraph embedding level and thus serve as a segment separator.

Step 216 may alternatively involve processing of a sequence of BiDi-neutral characters delimiting two segments of structured text, through a Unicode Bidirectional Algorithm (UBA) implementation. Processing the delimiter of the structured text may include, for example, executing instructions of the UBA on the delimiter of structured text and receiving an output from the UBA containing a processed delimiting sequence. In an embodiment, the delimiter of structured text including the inserted LRM on a side and the inserted RLM on the other side may be passed through a UBA implementation. Inserting the LRM and the RLM may cause a directionality mismatch which may cause a conflict in resolving the embedding level of the delimiting neutral sequence. The UBA may respond to the conflict by selecting an embedding level that matches the paragraph level for the delimiter of the structured text. For example, the UBA may determine that the LRM and RLM characters request functions that conflict, identify a base text direction for the segment of bidirectional text (e.g., left-to-right or right-to left), and utilize the identified base text direction for the delimiter of bidirectional text. Thus, by using mismatching characters (e.g., LRM and RLM) on either side of the BiDi-neutral segment delimiter of bidirectional text, the segment delimiter of bidirectional text will be processed in the identified base text direction.

Step 216 may alternatively involve processing of a structured text delimiter containing strong directional BiDi characters through a Unicode Bidirectional Algorithm (UBA) implementation. Processing the delimiter of the structured text may include, for example, executing instructions of the UBA on the delimiter of structured text and receiving an output from the UBA containing a processed delimiting sequence. In an embodiment, the delimiter of structured text including the inserted LRM and the inserted RLM on either side may be passed through a UBA implementation. The LRM and the RLM may be a directionality mismatch and, according to the UBA, at least one of them (LRM in LTR paragraph or RLM in RTL paragraph) may match the paragraph embedding level and thus serve as a segment separator.

Embodiments of the present invention may involve a method for isolating a segment of bidirectional text. The method may include identifying a delimited segment of bidirectional text (e.g., "TOKEN_B"), inserting a Unicode left-to-right character (LRM) on a first side of the delimited segment of bidirectional text (e.g., "<LRM>TOKEN_B"), and inserting a Unicode right-to-left character (RLM) on a second side of the delimited segment of bidirectional text (e.g., "<LRM>TOKEN_B<RLM>"). The method may further include inserting RLM on the first side and inserting LRM on the first side (e.g., "<RLM><LRM>TOKEN_B<RLM><LRM>"). An object of the method may be to enable a delimiter of structured text with an unknown paragraph direction to be passed through a UBA implementation and displayed in a correct paragraph direction.

Figure 4:
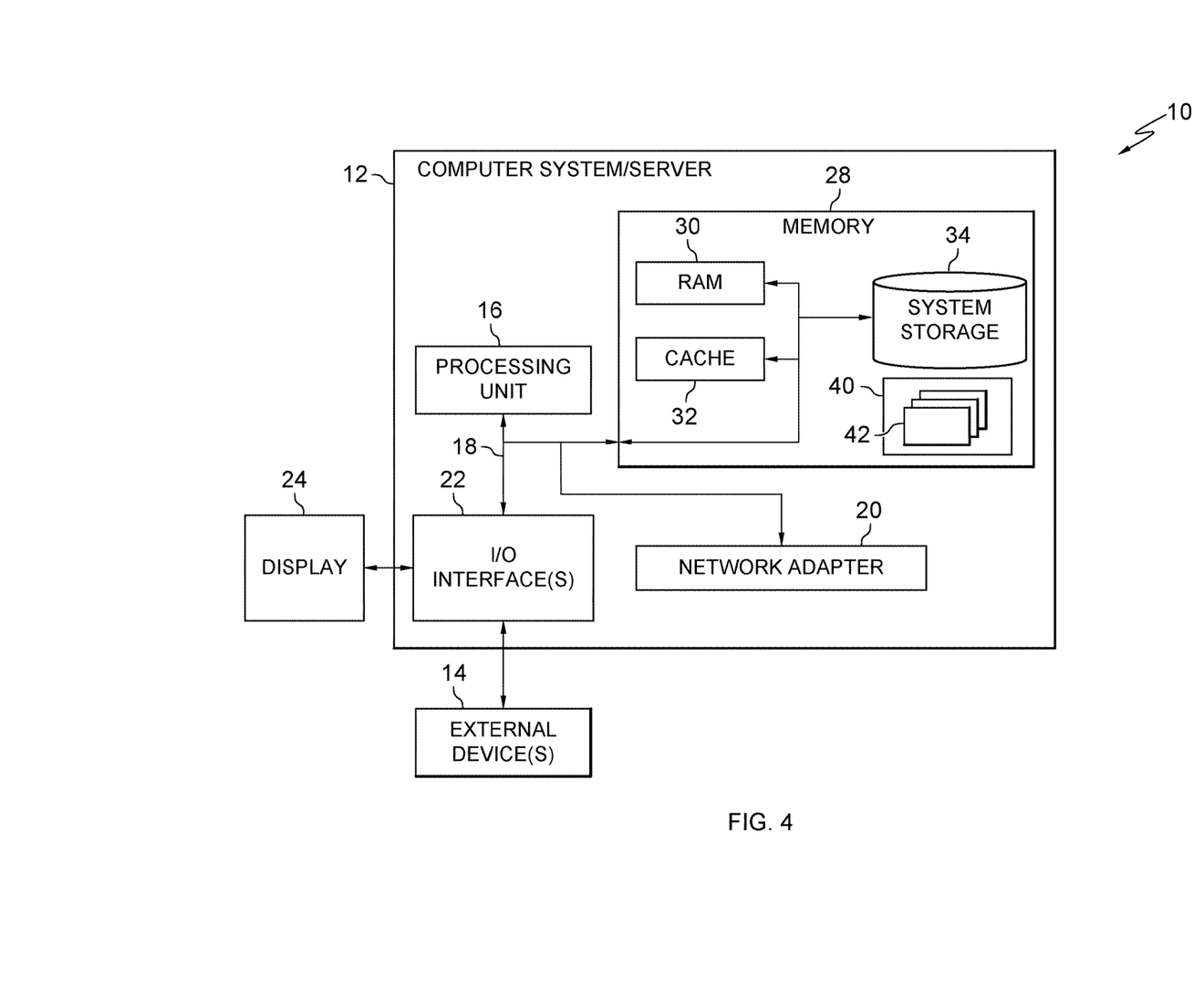
FIG. 4 depicts a block diagram of components of a proxy server computer executing the preprocessing program, in accordance with an embodiment of the present invention.

Referring now to FIG. 4, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A method for isolating a segment of bidirectional text, the method comprising:
receiving a bidirectional text comprising a delimited segment of bidirectional text on a computing device, wherein the delimited segment of bidirectional text is structured text, wherein the computing device communicates with a bidirectional text database and a preprocessing program database, wherein the bidirectional text database includes text in one or more languages, and wherein the received bidirectional text is stored in the bidirectional text database;
identifying the delimited segment of bidirectional text;
inserting a Unicode left-to-right character (LRM) on a first side of the delimited segment of bidirectional text, wherein the LRM isolates the first side of the delimited segment of bidirectional text;
inserting a Unicode right-to-left character (RLM) on a second side of the delimited segment of bidirectional text, wherein the RLM isolates the second side of the delimited segment of bidirectional text, wherein inserting the LRM and the RLM causes a directionality mismatch for the segment of bidirectional text, wherein the directionality mismatch between the LRM and the RLM causes a conflict, and wherein in response to the conflict, selecting a base text direction for the segment of bidirectional text;
processing the delimited segment of bidirectional text through a Unicode Bidirectional Algorithm (UBA) implementation; and
displaying the processed delimited segment of bidirectional text, wherein the processed delimited segment of bidirectional text is displayed in a correct text direction.

2. The method of claim 1, further comprising:
inserting the LRM on the second side of the delimited segment of bidirectional text; and
inserting the RLM on the first side of the delimited segment of bidirectional text.

3. The method of claim 1, wherein the delimited segment of bidirectional text has a base text direction of at least one of left-to-right or right-to-left.

4. The method of claim 1, wherein a base text direction of the delimited segment of bidirectional text is unknown to a user.

5. A computer program product for isolating a segment of bidirectional text, the computer program product comprising a computer readable storage medium having program instructions embodied therewith, wherein the computer readable storage medium is not a transitory signal per se, the program instructions executable by a computer to cause the computer to perform a method comprising:
receiving, by the computer, a bidirectional text comprising a delimited segment of bidirectional text, wherein the delimited segment of bidirectional text is structured text, wherein the computer communicates with a bidirectional text database and a preprocessing program database, wherein the bidirectional text database includes text in one or more languages, and wherein the received bidirectional text is stored in the bidirectional text database;
identifying, by the computer, the delimited segment of bidirectional text;
inserting, by the computer, a Unicode left-to-right character (LRM) on a first side of the delimited segment of bidirectional text, wherein the LRM isolates the first side of the delimited segment of bidirectional text;
inserting, by the computer, a Unicode right-to-left character (RLM) on a second side of the delimited segment of bidirectional text, wherein the RLM isolates the second side of the delimited segment of bidirectional text, wherein inserting the LRM and the RLM causes a directionality mismatch for the segment of bidirectional text, wherein the directionality mismatch between the LRM and the RLM causes a conflict, and wherein in response to the conflict, selecting a base text direction for the segment of bidirectional text;
processing, by the computer, the delimited segment of bidirectional text through a Unicode Bidirectional Algorithm (UBA) implementation; and
displaying, by the computer, the processed delimited segment of bidirectional text, wherein the processed delimited segment of bidirectional text is displayed in a correct text direction.

6. The computer program product of claim 5, further comprising:
inserting the LRM on the second side of the delimited segment of bidirectional text; and
inserting the RLM on the first side of the delimited segment of bidirectional text.

7. The computer program product of claim 5, wherein the delimited segment of bidirectional text has a base text direction of at least one of left-to-right or right-to-left.

8. A computer program product for isolating a segment of bidirectional text, the computer program product comprising a computer readable storage medium having program instructions embodied therewith, wherein the computer readable storage medium is not a transitory signal per se, the program instructions executable by a computer to cause the computer to perform a method comprising:
receiving, by the computer, a bidirectional text comprising a delimited segment of bidirectional text, wherein the delimited segment of bidirectional text is structured text, wherein the computer communicates with a bidirectional text database and a preprocessing program database, wherein the bidirectional text database includes text in one or more languages, and wherein the received bidirectional text is stored in the bidirectional text database;
identifying, by the computer, the delimited segment of bidirectional text;
inserting, by the computer, a Unicode left-to-right character (LRM) on a first side and a second side of the delimited segment of bidirectional text, wherein the LRM isolates the first side of the delimited segment of bidirectional text;
inserting, by the computer, a Unicode right-to-left character (RLM) on the first side and the second side of the delimited segment of bidirectional text, wherein the RLM isolates the second side of the delimited segment of bidirectional text, wherein inserting the LRM and the RLM causes a directionality mismatch for the segment of bidirectional text, wherein the directionality mismatch between the LRM and the RLM causes a conflict, and wherein in response to the conflict, selecting a base text direction for the segment of bidirectional text;

processing, by the computer, the delimited segment of bidirectional text through a Unicode Bidirectional Algorithm (UBA) implementation; and displaying, by the computer, the processed delimited segment of bidirectional text, wherein the processed delimited segment of bidirectional text is displayed in a correct text direction.

9. The computer program product of claim 8, wherein the delimited segment of bidirectional text has a base text direction of at least one of left-to-right or right-to-left.

10. A computer system for isolating a segment of bidirectional text, the computer system comprising:

one or more computer processors;

one or more computer-readable storage media;

program instructions stored on the computer-readable storage media for execution by at least one of the one or more processors, the program instructions comprising:

instructions to receive, by the computer, a bidirectional text comprising a delimited segment of bidirectional text, wherein the delimited segment of bidirectional text is structured text, wherein the computer communicates with a bidirectional text database and a preprocessing program database, wherein the bidirectional text database includes text in one or more languages, and wherein the received bidirectional text is stored in the bidirectional text database;

instructions to identify the delimited segment of bidirectional text;

instructions to insert a Unicode left-to-right character (LRM) on a first side of the delimited segment of bidirectional text, wherein the LRM isolates the first side of the delimited segment of bidirectional text;

instructions to insert a Unicode right-to-left character (RLM) on a second side of the delimited segment of bidirectional text, wherein the RLM isolates the second side of the delimited segment of bidirectional text, wherein inserting the LRM and the RLM causes a directionality mismatch for the segment of bidirectional text, wherein the directionality mismatch between the LRM and the RLM causes a conflict, and wherein in response to the conflict, selecting a base text direction for the segment of bidirectional text;

instructions to process the delimited segment of bidirectional text through a Unicode Bidirectional Algorithm (UBA) implementation; and instructions to display the delimited segment of bidirectional text, wherein the delimited segment of bidirectional text is displayed in a correct text direction.

11. The system of claim 10, further comprising:

instructions to insert the LRM on the second side of the delimited segment of bidirectional text; and instructions to insert the RLM on the first side of the delimited segment of bidirectional text.

12. The system of claim 10, further comprising:

receiving the delimited segment of bidirectional text.

13. The system of claim 10, wherein the delimited segment of bidirectional text has a base text direction of at least one of left-to-right or right-to-left.

14. A computer system for isolating a segment of bidirectional text, the computer system comprising:

one or more computer processors;

one or more computer-readable storage media;

program instructions stored on the computer-readable storage media for execution by at least one of the one or more processors, the program instructions comprising:

instructions to receive, by the computer, a bidirectional text comprising a delimited segment of bidirectional text, wherein the delimited segment of bidirectional text is structured text, wherein the computer communicates with a bidirectional text database and a preprocessing program database, wherein the bidirectional text database includes text in one or more languages, and wherein the received bidirectional text is stored in the bidirectional text database;

instructions to identify the delimited segment of bidirectional text;

instructions to insert a Unicode left-to-right character (LRM) on a first side and a second side of the delimited segment of bidirectional text, wherein the LRM isolates the first side of the delimited segment of bidirectional text;

instructions to insert a Unicode right-to-left character (RLM) on the first side and the second side of the delimited segment of bidirectional text, wherein the RLM isolates the second side of the delimited segment of bidirectional text, wherein inserting the LRM and the RLM causes a directionality mismatch for the segment of bidirectional text, wherein the directionality mismatch between the LRM and the RLM causes a conflict, and wherein in response to the conflict, selecting a base text direction for the segment of bidirectional text;

instructions to process the delimited segment of bidirectional text through a Unicode Bidirectional Algorithm (UBA) implementation; and instructions to display the delimited segment of bidirectional text, wherein the delimited segment of bidirectional text is displayed in a correct text direction.

\* \* \* \* \*